US012349080B2

(12) United States Patent
Li et al.

(10) Patent No.: US 12,349,080 B2
(45) Date of Patent: Jul. 1, 2025

(54) DOWNLINK POWER ALLOCATION FOR NBIOT

(71) Applicant: Lenovo (Beijing) Limited, Beijing (CN)

(72) Inventors: Yingying Li, Haidian District (CN); Hongmei Liu, Changping District (CN); Zhi Yan, Xicheng District (CN); Yuantao Zhang, Dongcheng District (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 425 days.

(21) Appl. No.: 18/001,459

(22) PCT Filed: Jun. 19, 2020

(86) PCT No.: PCT/CN2020/097087
§ 371 (c)(1),
(2) Date: Dec. 9, 2022

(87) PCT Pub. No.: WO2021/253395
PCT Pub. Date: Dec. 23, 2021

(65) Prior Publication Data
US 2023/0309028 A1 Sep. 28, 2023

(51) Int. Cl.
*H04W 52/32* (2009.01)
*H04W 52/34* (2009.01)
(52) U.S. Cl.
CPC ....... *H04W 52/325* (2013.01); *H04W 52/346* (2013.01)

(58) Field of Classification Search
CPC ............ H04W 52/325; H04W 52/346; H04W 52/143; H04W 52/16; H04B 7/26
See application file for complete search history.

(56) References Cited

U.S. PATENT DOCUMENTS

2016/0057758 A1* 2/2016 Ouchi ................... H04W 52/58
370/280
2017/0273026 A1 9/2017 Fakoorian et al.
(Continued)

FOREIGN PATENT DOCUMENTS

JP 2010041587 A 2/2010
WO 2012154094 A1 11/2012
(Continued)

OTHER PUBLICATIONS

Malik, Hassan, et al. "Radio resource management scheme in NB-IoT systems." IEEE Access 6 (2018): 15051-15064. (Year: 2018).*

(Continued)

*Primary Examiner* — Sharad Rampuria
(74) *Attorney, Agent, or Firm* — FIG. 1 Patents

(57) ABSTRACT

Methods and apparatuses for downlink power allocation for NBIoT are disclosed. A method comprises receiving a first reference signal (NRS), a first data and a second data, wherein the first reference signal is associated with a first transmission power (E_NRS); the first data is in a symbol without the first reference signal, and the first data is associated with a second transmission power (E_A); and the second data is in a symbol in which the first reference signal is received; and the second data is associated with a third transmission power (E_B).

20 Claims, 17 Drawing Sheets

(56) References Cited

U.S. PATENT DOCUMENTS

2017/0289918 A1* 10/2017 Sun ............... H04W 52/325
2020/0351801 A1* 11/2020 Jeon ............... H04W 52/48

FOREIGN PATENT DOCUMENTS

WO     2013062359 A1     5/2013
WO     2013122433 A1     8/2013

OTHER PUBLICATIONS

202080101659.X , "Foreign Office Action", CN Application No. 202080101659, Jul. 23, 2024, 9 pages.

Qualcomm Incorporated , "NB-POSCH design", 3GPP Draft; R1-161934, vol. RAN WG1, <Retrieved from the Internet: URL:http://www.3gpp.org/ftp/tsg_ran/WG1_RL1/TSGRI_AH/LTE_NB-IoT_1603/Docs/>, Mar. 16, 2016, 3 pages.

ZTE , "DL power allocation for NB-IoT", 3GPP Draft; R1-161866, vol. RAN WG1, Retrieved from the Internet: URL: <https://ftp.3gpp.org/Email_Discussions /RAN1/Archives/RAN1_Ad-hoc_NB-IoT_March16/Docs/RI-161866.zip RI-161866 DL power allocation.doc>, Feb. 5, 2020, 2 pages.

PCT/CN2020/097087 , "International Preliminary Report on Patentability", PCT Application No. PCT/CN2020/097087, Dec. 29, 2022, 5 pages.

PCT/CN2020/097087 , "International Search Report and Written Opinion", PCT Application No. PCT/CN2020/097087, Mar. 10, 2021, 6 pages.

"Extended European Search Report", European Application No. 20941255.0, Feb. 14, 2024, 12 pages.

\* cited by examiner

| $P_B$ | $\rho_B/\rho_A$ | |
|---|---|---|
| | One Antenna Port | Two or Four Antenna Ports |
| 0 | 1 | 5/4 |
| 1 | 4/5 | 1 |
| 2 | 3/5 | 3/4 |
| 3 | 2/5 | 1/2 |

|  | | time domain | | | | | | |
|---|---|---|---|---|---|---|---|---|
| | | 0 | 1 | 2 | 3 | 4 | 5 | 6 |
| | 11 | 5 | 5 | 5 | 5 | 5 | 5 | 5 |
| | 10 | 5 | 5 | 5 | 5 | 5 | 5 | 5 |
| | 9 | 5 | 5 | 5 | 5 | 10 | 5 | 5 |
| | 8 | 5 | 5 | 5 | 5 | 5 | 5 | 5 |
| | 7 | 5 | 5 | 5 | 5 | 5 | 5 | 5 |
| | 6 | 10 | 5 | 5 | 5 | 5 | 5 | 5 |
| | 5 | 5 | 5 | 5 | 5 | 5 | 5 | 5 |
| | 4 | 5 | 5 | 5 | 5 | 5 | 5 | 5 |
| frequency domain | 3 | 5 | 5 | 5 | 5 | 10 | 5 | 5 |
| | 2 | 5 | 5 | 5 | 5 | 5 | 5 | 5 |
| | 1 | 5 | 5 | 5 | 5 | 5 | 5 | 5 |
| | 0 | 10 | 5 | 5 | 5 | 5 | 5 | 5 |
| sum | | 70 | 60 | 60 | 60 | 70 | 60 | 60 |
| | | S B | S A | S A | S A | S B | S A | S A |

| | | time domain | | | | | | |
|---|---|---|---|---|---|---|---|---|
| | | 0 | 1 | 2 | 3 | 4 | 5 | 6 |
| frequency domain | 11 | 3 | 5 | 5 | 5 | 3 | 5 | 5 |
| | 10 | 3 | 5 | 5 | 5 | 3 | 5 | 5 |
| | 9 | 3 | 5 | 5 | 5 | 10 | 5 | 5 |
| | 8 | 3 | 5 | 5 | 5 | 3 | 5 | 5 |
| | 7 | 3 | 5 | 5 | 5 | 3 | 5 | 5 |
| | 6 | 10 | 5 | 5 | 5 | 3 | 5 | 5 |
| | 5 | 3 | 5 | 5 | 5 | 3 | 5 | 5 |
| | 4 | 3 | 5 | 5 | 5 | 3 | 5 | 5 |
| | 3 | 3 | 5 | 5 | 5 | 10 | 5 | 5 |
| | 2 | 3 | 5 | 5 | 5 | 3 | 5 | 5 |
| | 1 | 3 | 5 | 5 | 5 | 3 | 5 | 5 |
| | 0 | 10 | 5 | 5 | 5 | 3 | 5 | 5 |
| sum | | 50 | 60 | 60 | 60 | 50 | 60 | 60 |
| | | S_B | S_A | S_A | S_A | S_B | S_A | S_A |

Figure 3C

PA=-3dB, PB=1 frequency domain / time domain

| freq \ time | 0 | 1 | 2 | 3 | 4 | 5 | 6 |
|---|---|---|---|---|---|---|---|
| 11 | 5 | 5 | 5 | 5 | 5 | 5 | 5 |
| 10 | 5 | 5 | 5 | 5 | 5 | 5 | 5 |
| 9 |   |   | 5 | 5 |   | 5 | 5 |
| 8 | 5 | 5 | 5 | 5 | 5 | 5 | 5 |
| 7 | 5 | 5 | 5 | 5 | 5 | 5 | 5 |
| 6 |   | 10 | 5 | 5 |   | 5 | 5 |
| 5 | 5 | 5 | 5 | 5 | 5 | 5 | 5 |
| 4 | 5 | 5 | 5 | 5 | 5 | 5 | 5 |
| 3 |   |   | 5 | 5 |   | 5 | 5 |
| 2 | 5 | 5 | 5 | 5 | 5 | 5 | 5 |
| 1 | 5 | 5 | 5 | 5 | 5 | 5 | 5 |
| 0 |   | 10 | 5 | 5 |   | 5 | 5 |
| sum | 40 | 60 | 60 | 60 | 40 | 60 | 60 |
|   | S B | S B | S A | S A | S B | S A | S A |

Figure 3E

| PB | $\rho_B/\rho_A$ | |
|---|---|---|
| | One NRS Antenna Port | Two NRS Antenna Ports |
| 0 | 1 | 5/4 |
| 1 | 4/5 | 1 |
| 2 | 3/5 | 3/4 |
| 3 | 2/5 | 1/2 |

Figure 6

| PC | $\rho_C/\rho_A$ | |
|---|---|---|
| | One CRS Antenna Port | Two or Four CRS Antenna Ports |
| 0 | 1 | 5/4 |
| 1 | 4/5 | 1 |
| 2 | 3/5 | 3/4 |
| 3 | 2/5 | 1/2 |

Figure 7

|  | time domain | | | | | | |
|---|---|---|---|---|---|---|---|
|  | 0 | 1 | 2 | 3 | 4 | 5 | 6 |
| 11 | 40 | 40 | 40 | 40 | 40 | 40 | 40 |
| 10 | 40 | 40 | 40 | 40 | 40 | 40 | 40 |
| 9 | 40 | 40 | 40 | 10 | 40 | 40 | 80 |
| 8 | 40 | 40 | 40 | 40 | 40 | 40 | 40 |
| 7 | 40 | 40 | 40 | 40 | 40 | 40 | 40 |
| 6 | 10 | 40 | 40 | 40 | 40 | 80 | 40 |
| 5 | 40 | 40 | 40 | 40 | 40 | 40 | 40 |
| 4 | 40 | 40 | 40 | 40 | 40 | 40 | 40 |
| 3 | 40 | 40 | 40 | 10 | 40 | 40 | 80 |
| 2 | 40 | 40 | 40 | 40 | 40 | 40 | 40 |
| 1 | 40 | 40 | 40 | 40 | 40 | 40 | 40 |
| 0 | 10 | 40 | 40 | 40 | 40 | 80 | 40 |
| sum | 420 | 480 | 480 | 420 | 480 | 560 | 560 |
|  | S C | S A | S A | S C | S A | S B | S B |

Figure 8

DOWNLINK POWER ALLOCATION FOR NBIOT

FIELD

The subject matter disclosed herein generally relates to wireless communications, and more particularly relates to downlink (DL) power allocation for NBIoT.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Reference Signal (RS), Single Carrier Frequency Division Multiple Access (SC-FDMA), Time-Division Duplex (TDD), Time Division Multiplex (TDM), User Entity/Equipment (Mobile Terminal) (UE), Universal Mobile Telecommunications System (UMTS), Worldwide Interoperability for Microwave Access (WiMAX), Internet-of-Things (IoT), Narrowband Internet-of-Things (NB-IoT or NBIoT), Long Term Evolution (LTE), Narrowband (NB), Physical Downlink Shared Channel (PDSCH), Narrowband Physical Downlink Shared Channel (NPDSCH), Physical Resource Block (PRB), Universal Mobile Telecommunications System (UMTS), Evolved-UMTS Terrestrial Radio Access (E-UTRA or EUTRA), Quadrature Phase Shift Keying (QPSK), Quadrature Amplitude Modulation (QAM), Cyclic Prefix (CP), resource element (RE), Cell Reference Signal (CRS), energy per resource element (EPRE), Multi-User Multiple-Input Multiple-Output (MU MIMO), Automatic Gain Control (AGC), Narrowband reference signal (NRS).

The downlink (DL) power allocation for LTE is described as a background.

There are two types of OFDM symbols for LTE downlink power allocation. In the following description, OFDM symbol is abbreviated as symbol for simplicity. In condition of normal CP (Cyclic Prefix), one slot has 7 symbols; and in condition of extended CP, one slot has 6 symbols.

FIG. 1 illustrates a physical resource block (PRB) in normal CP in the condition of one antenna port (e.g., Antenna port 0). The physical resource block (PRB) is comprised of 12 subcarriers in frequency domain and one slot (7 symbols) in time domain. A resource element (RE) refers to one symbol in time domain and one subcarrier in frequency domain. As shown in FIG. 1, one physical resource block (PRB) is comprised of 84 (=12*7) resource elements (REs), each of which is indicated as a block in FIG. 1. In the PRB illustrated in FIG. 1, CRS (Cell Reference Signal) is present in symbols 0 and 4 in time domain and in every six subcarriers in frequency domain. That is, with reference to FIG. 1, CRS for antenna port 0 is present in the following REs: (symbol 0, subcarrier 0), (symbol 0, subcarrier 6), (symbol 4, subcarrier 3), and (symbol 4, subcarrier 9).

Depending on the presence or non-presence of CRS RE in symbols, the symbols in one slot are divided into two types (Type A symbol and Type B symbol). If all REs in a symbol, which do not contain any CRS RE (indicated as R0 in FIG. 1), are PDSCH REs, the symbol belongs to Type A symbol. Symbols 1, 2, 3, 5 and 6 of the PRB in FIG. 1 belong to Type A symbol for the case of the number of CRS antenna ports being 1 or 2. On the other hand, if the REs in a symbol contain CRS REs, the symbol belongs to type B symbol. Symbols 0 and 4 of the PRB in FIG. 1 belong to Type B symbol for the case of the number of CRS antenna ports being 1 or 2.

The EPRE (energy per resource element) of CRS RE (i.e. CRS EPRE, abbreviated as E_RS) is constant across downlink system bandwidth, and is configured by a higher layer parameter referenceSignalPower. The CRS EPRE (E_RS) is cell-specific. The ratio of PDSCH EPRE to cell-specific CRS EPRE among PDSCH REs (not applicable to PDSCH REs with zero EPRE) for each OFDM symbol (e.g., including Type A symbol and Type B symbol) is denoted by either $\rho_A$ or $\rho_B$ according to the OFDM symbol index as given by the following Table 1.

TABLE 1

OFDM symbol indices within a slot of a non-MBSFN subframe where the ratio of the corresponding PDSCH EPRE to the cell-specific RS EPRE is denoted by $\rho_A$ or $\rho_B$

| Number of antenna ports | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
|---|---|---|---|---|
| | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

Detailed explanations are given. Each type A symbol is comprised only of PDSCH REs (e.g. in FIG. 1, each type A symbol is comprised of 12 PDSCH REs in one PRB). The EPRE of each PDSCH RE in type A symbols (E_A) is derived from the CRS EPRE (E_RS). In particular, the ratio of E_A to E_RS is denoted by $\rho_A$=E_A/E_RS. Each type B symbol includes PDSCH REs and CRS REs (e.g. in FIG. 1, each type B symbol is comprised of 10 PDSCH REs and 2 CRS REs in one PRB for the case of the number of CRS antenna ports being 1). The EPRE of each PDSCH RE in type B symbols (E_B) is derived from E_RS. In particular, the ratio of E_B to E_RS is denoted by pB=E_B/E_RS.

$\rho_A$, which is UE-specific, is determined by PA, and in particular, PA[dB]=10 lg$\rho_A$ except for 4TX diversity and MU MIMO. PA is UE-specific configured by a higher layer parameter p-a from a set of {−6, −4.77, −3, −1.77, 0, 1, 2, 3}[dB]. Accordingly, PA is a number chosen from a set of {¼, ⅓, ½, ⅔, 1, 1.2589, 1.5849, 2}.

$\rho_B$ is determined by PB. In particular, $\rho_B/\rho_A$ is determined by the value of PB. PB is the PDSCH EPRE power index, and is cell-specific configured by a higher layer parameter p-b from a set of {0, 1, 2, 3}. FIG. 2 illustrates a table for the cell-specific ratio $\rho_B/\rho_A$ for 1, 2, or 4 cell specific antenna ports, which indicates the value of $\rho_B/\rho_A$ for different values of PB. In condition of "one antenna port" and in condition of "two or four antenna ports", the values of $\rho_B/\rho_A$ are different for the same value of PB.

In summary, the eNB can configure the downlink power allocation with three parameters: referenceSignalPower, PA and PB.

Take one PRB PDSCH transmission as an example. S_A denotes the total power of one type A symbol which is comprised of 12 PDSCH REs, i.e. S_A=12*E_A. S_B denotes the total power of one type B symbol. For example, in the example of FIG. 1, when a type B symbol includes 2 CRS REs and 10 PDSCH REs, S_B=2*E_RS+10*E_B. The power efficiency for the PRB or each allocated UE is defined as min(S_A, S_B)/max(S_A, S_B). As the parameter referenceSignalPower only indicates a reference of the power, the power efficiency is determined by the configuration of PA and PB.

Some examples of the power efficiency in different configurations of PA and PB are shown in FIGS. 3A-3E.

FIG. 3A is an example of downlink power allocation of one antenna port (e.g., Antenna port 0), in which PA=−3 dB and PB=0, and E_RS is configured as 10 dBm. It can be derived that S_A=60 dBm and S_B=70 dBm. Therefore, the power efficiency is 60/70=0.86.

FIG. 3B is an example of downlink power allocation of one antenna port (e.g., Antenna port 0), in which PA=−3 dB and PB=1, and E_RS is configured as 10 dBm. It can be derived that S_A=60 dBm and S_B=60 dBm. Therefore, the power efficiency is 60/60=1.

FIG. 3C is an example of downlink power allocation of one antenna port (e.g., Antenna port 0), in which PA=−3 dB and PB=2, and E_RS is configured as 10 dBm. It can be derived that S_A=60 dBm and S_B=50 dBm. Therefore, the power efficiency is 50/60=0.83.

FIG. 3D is an example of downlink power allocation of one antenna port (e.g., Antenna port 0) of two antenna ports (e.g., Antenna ports 0 and 1), in which PA=−3 dB and PB=1, and E_RS is configured as 10 dBm. It can be seen that each of type B symbols (symbols 0 and 4) includes not only 8 PDSCH REs and 2 CRS REs, but also 2 REs with zero transmitting power. The REs with zero transmitting power are for the CRS for another antenna port (e.g. Antenna port 1). In FIG. 3D, S_A=60 dBm and S_B=60 dBm. Therefore, the power efficiency is 60/60=1.

FIG. 3E is an example of downlink power allocation of one antenna port (e.g., Antenna port 2) of four antenna ports (e.g., Antenna ports 0, 1, 2 and 3), in which PA=−3 dB and PB=1, and E_RS is configured as 10 dBm. It can be seen that symbols 0, 1 and 4 are type B symbols. Each of symbols 0 and 4 includes 4 REs with zero transmitting power, while symbol 1 includes 2 REs with zero transmitting power. The REs with zero transmitting power are for the CRS for other antenna ports (e.g., Antenna ports 0, 1, and 3). In FIG. 3E, S_A=60 dBm and S_B=40 or 60 dBm. Therefore, the power efficiency is 40/60=0.67.

There are a number of factors that are necessary to be considered when the eNB configures PA and PB, e.g. total power for each OFDM, EPRE, RS power boosting for converge, power saving, interference. For example, the eNB may offload some PRB(s) (which means that only "CRS" REs are transmitted while no PDSCH REs are transmitted in those PRB(s)) or may boost CRS power to adjust the configuration of PA and PB. When two types of symbols have different powers (i.e. S_A*S_B), eNB will clip the higher power symbols or use less power. In this condition, the UE will adjust AGC (Automatic Gain Control) based on peak power or averaging power or lowest power, which would degrade the detection performance. Anyway, UE is expected to receive almost same power for each symbol.

As a matter of fact, only some of configurations of PA and PB may lead to the same power of the two types of symbols, which achieves the highest power efficiency (100%). Examples of such configurations of PA and PB may be as follows: (PA[dB], PB)=(0, 0), (−3, 1), (−4.77, 2), (−6, 3). From operator (eNB) point of view, most of the configurations of PA and PB combination will not be configured, e.g., (PA[dB], PB)=(3, 3), (2, 3), (−6, 0) due to lower power efficiency.

As described above, in LTE, due to the presence of CRS REs in type B symbols, the EPRE of each PDSCH RE in type A symbols (E_A) and the EPRE of each PDSCH RE in type B symbols (E_B) can be configured by the eNB by configuring PA and PB to implement the downlink power allocation.

In case of NBIoT, the downlink power allocation is different.

In NBIoT (inband deployment or standalone deployment or guardband deployment), the downlink REs can be NPDSCH REs or NRS (Narrowband reference signal) REs. In case of inband deployment, the downlink REs may alternatively be CRS REs.

The UE may assume that the EPRE of NRS REs (NRS EPRE) is constant across the downlink NBIoT system bandwidth and constant across all subcarriers that contain NRS.

The UE may assume the ratio of NPDSCH EPRE to NRS EPRE among NPDSCH REs (not applicable to NPDSCH REs with zero EPRE) is 0 dB for an NBIoT cell with one NRS antenna port and −3 dB for an NBIoT cell with two NRS antenna ports.

If higher layer parameter operationModeInfo indicates '00' or samePCI-Indicator indicates 'samePC' for a cell, the ratio of NRS EPRE to CRS EPRE is given by the parameter nrs-CRS-PowerOffset if the parameter nrs-CRS-PowerOffset is provided by higher layers.

It can be seen that each type of REs (NRS RE, NPDSCH RE, CRS RE) is associated with a specific EPRE (NRS EPRE, NPDSCH EPRE, CRS EPRE), which means that the eNB transmits each type of REs with the power indicated by each specific EPRE while the UE assumes the same. In Release 13 NBIoT, the actual EPRE of NBIoT (e.g. NPDSCH EPRE) except the NRS EPRE is up to eNB implementation. In Release 13 NBIoT, only QPSK is supported (i.e. 16QAM is not supported). The UE does not need to know the exact value of powers (ERPEs) to perform the demodulation. Therefore, eNB can transmit NPDSCH with any power, so long as the NRS power is constant.

Although any EPRE of NBIoT PDSCH is detectable (can be demodulated), UE is expected to receive almost same power for each PRB to adjust the AGC.

In Release 17 NBIoT, 16QAM will be supported. Therefore, the UE needs to know the transmission powers (EPRE)

of NPDSCH to correctly perform the demodulation. It is an object of the present invention to propose methods and apparatuses for NBIoT downlink power allocation, especially when 16QAM is supported in Release 17 NBIoT.

It might be straight forward to use the LTE downlink power allocation as a baseline for NBIoT downlink power allocation in Release 17 NBIoT. However, it is not possible to directly use the LTE downlink power allocation at least due to the following differences between LTE and NBIoT.

First, as described above, for NBIoT inband deployment, downlink REs can be three types: PDSCH REs or NRS REs or CRS REs. Accordingly, there are three types of OFDM symbols (e.g., OFDM symbols with NRS, OFDM symbols with CRS, and OFDM symbols without NRS or CRS). So, it is not appropriate to only define two types of symbols as in LTE downlink power allocation.

Secondly, UE of LTE system receives the downlink signal with a bandwidth of 20 MHz and the PDSCH bandwidth can be determined by eNB scheduling. However, UE of NBIoT receives the downlink signal with bandwidth of 1 PRB and PDSCH bandwidth is fixed as 1 PRB at least for inband deployment.

For example, as shown in FIG. 4, the eNB schedules 1 PRB for PDSCH transmission with PA=−3 dB and PB=3 (1 antenna port, and E_RS is configured as 10 dBm). If UE of LTE has a receiving bandwidth of 2 PRBs (scheduled by eNB), the powers of symbols are the same across 2 PRBs. That is, although the power is different per PRB per symbol (in the first PRB, S_A=60 dBm while S_B=40 dBm), the power is same per symbol per 2 PRBs (S_A=S_B=60 dBm), which can be achieved by ways of suitable eNB scheduling (e.g. by offloading the second PRB so that only CRS REs are transmitted in the second PRB). On the other hand, in NBIoT, when the eNB schedules 1 PRB for PDSCH transmission, the NBIoT UE receiving bandwidth, which cannot be adjusted by eNB scheduling, is fixed as 1 PRB. Therefore, it is not possible to offload some PRB(s) in NBIoT to balance the power among PRBs.

Therefore, in NBIoT, it has to design the power to be the same per PRB per symbol.

BRIEF SUMMARY

Methods and apparatuses for downlink power allocation for NBIoT are disclosed.

In one embodiment, a method comprises receiving a first reference signal (NRS), a first data and a second data, wherein the first reference signal is associated with a first transmission power (E_NRS); the first data is in a symbol without the first reference signal, and the first data is associated with a second transmission power (E_A); and the second data is in a symbol in which the first reference signal is received; and the second data is associated with a third transmission power (E_B). The second transmission power (E_A) may be determined by the first transmission power (E_NRS) and a first power ratio ($\rho_A$). The third transmission power (E_B) may be determined by the first transmission power (E_NRS) and a second power ratio ($\rho_B$). The second power ratio ($\rho_B$) may be determined by a first power ratio ($\rho_A$) and the number of antenna ports of the first reference signal (NRS).

In one embodiment, the method further comprises receiving a second reference signal (CRS) and a third data, wherein the second reference signal is associated with a fourth transmission power (E_CRS); and the third data is in a symbol in which the second reference signal is received; and the third data is associated with a fifth transmission power (E_C). The fourth transmission power (E_CRS) may be determined by the first transmission power (E_NRS) and a third power ratio ($\rho_{CRS}$). The fifth transmission power (E_C) may be determined by the first transmission power (E_NRS) and a fourth power ratio ($\rho_C$).

In another embodiment, the fourth power ratio ($\rho_C$) may be determined by at least one of the number of antenna ports of the first reference signal (NRS), the number of antenna ports of the second reference signal (CRS), a first power ratio ($\rho_A$), a second power ratio ($\rho_B$), a third power ratio ($\rho_{CRS}$) and a predefined power ratio value (M).

In some embodiment, the fourth power ratio ($\rho_C$) is determined by the first power ratio ($\rho_A$) and the number of antenna ports of the second reference signal (CRS). In other embodiment, the fourth power ratio ($\rho_C$) is determined by at least one of a first power ratio value ($\rho_{C1}$) determined by the first power ratio ($\rho_A$) and the third power ratio ($\rho_{CRS}$), a second power ratio value ($\rho_{C2}$) determined by the second power ratio ($\rho_B$) and the third power ratio ($\rho_{CRS}$), and the predefined power ratio value (M).

In some embodiment, the fourth power ratio ($\rho_C$) is determined by a larger or smaller value of at least two of the first power ratio value ($\rho_{C1}$), the second power ratio value ($\rho_{C2}$) and the predefined power ratio value (M). The fourth power ratio ($\rho_C$) ma be indicated by higher layer signaling from the first power ratio value ($\rho_{C1}$) and the second power ratio value ($\rho_{C2}$). The fourth power ratio ($\rho_C$) may alternatively be a value chosen from a predefined power ratio set, the value is the smallest value of the set that is larger than one of the first power ratio value ($\rho_{C1}$) and the second power ratio value ($\rho_{C2}$), or the largest value of the set that is smaller than said one of the first power ratio value ($\rho_{C1}$) and the second power ratio value ($\rho_{C2}$).

In one embodiment, a remote unit comprises a receiver that receives a first reference signal (NRS), a first data and a second data, wherein the first reference signal is associated with a first transmission power (E_NRS); the first data is in a symbol without the first reference signal, and the first data is associated with a second transmission power (E_A); and the second data is in a symbol in which the first reference signal is received; and the second data is associated with a third transmission power (E_B). The second transmission power (E_A) may be determined by the first transmission power (E_NRS) and a first power ratio ($\rho_A$). The third transmission power (E_B) may be determined by the first transmission power (E_NRS) and a second power ratio ($\rho_B$). The second power ratio ($\rho_B$) may be determined by a first power ratio ($\rho_A$) and the number of antenna ports of the first reference signal (NRS).

In another embodiment, a method comprises transmitting a first reference signal (NRS), a first data and a second data, wherein the first reference signal is associated with a first transmission power (E_NRS); the first data is in a symbol without the first reference signal, and the first data is associated with a second transmission power (E_A); and the second data is in a symbol in which the first reference signal is transmitted; and the second data is associated with a third transmission power (E_B).

In yet another embodiment, a base unit comprises a transmitter that transmits a first reference signal (NRS), a first data and a second data, wherein the first reference signal is associated with a first transmission power (E_NRS); the first data is in a symbol without the first reference signal, and the first data is associated with a second transmission power (E_A); and the second data is in a symbol in which the first reference signal is transmitted; and the second data is associated with a third transmission power (E_B).

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 2 illustrates the value of $\rho_B/\rho_A$ for different values of PB;

FIGS. 3A-3E illustrate examples of power efficiency in different configurations of PA and PB;

FIG. 6 illustrates the value of $\rho_B/\rho_A$ for different values of PB;

FIG. 7 illustrates the value of $\rho_C/\rho_A$ for different values of PC;

FIG. 8 illustrates an example of the problem for individually configuring PC;

DETAILED DESCRIPTION

Figure 1:
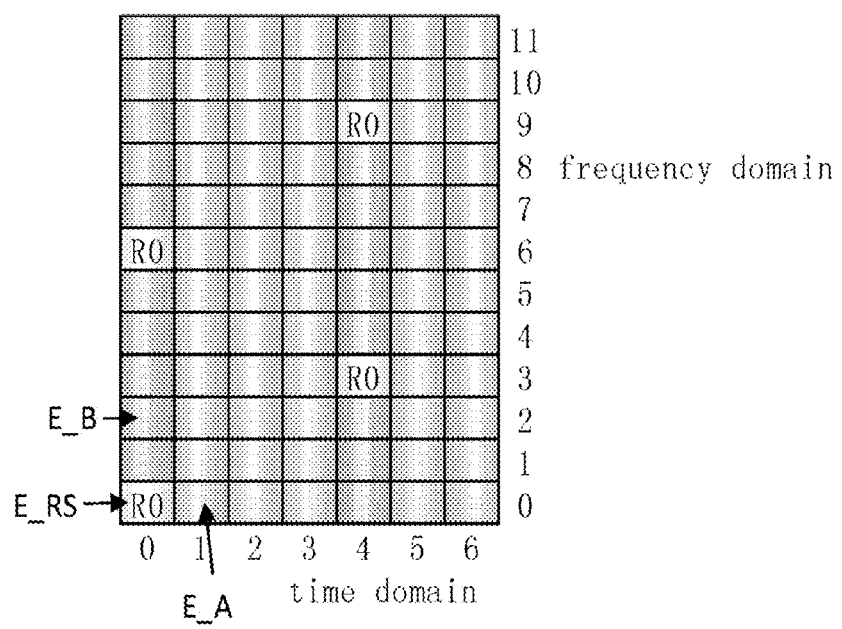
FIG. 1 illustrates an example of downlink power allocation for LTE.
Figure 3B:
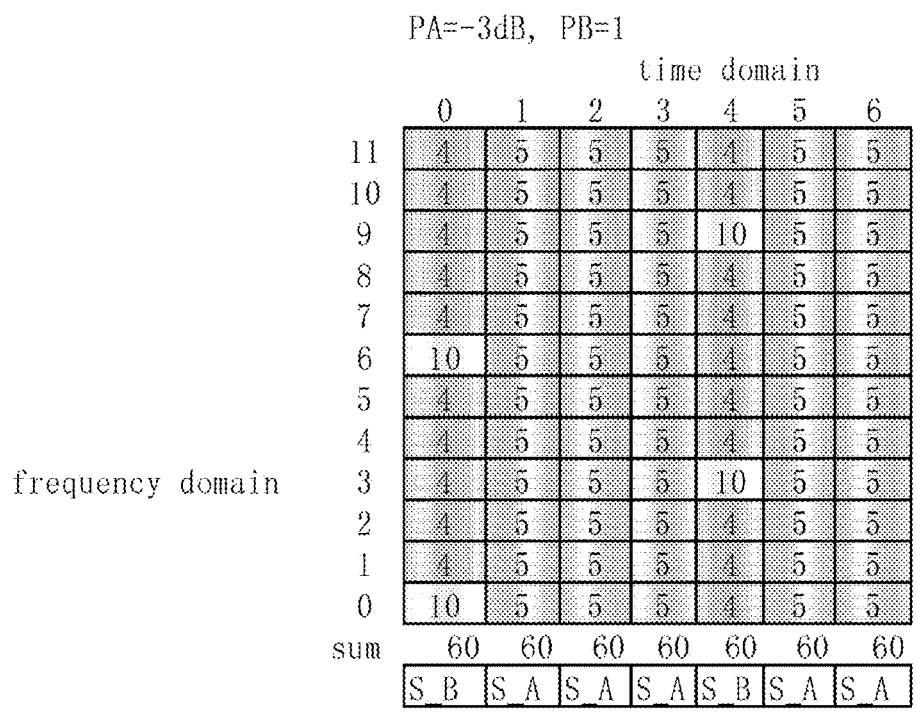
Figure 3D:
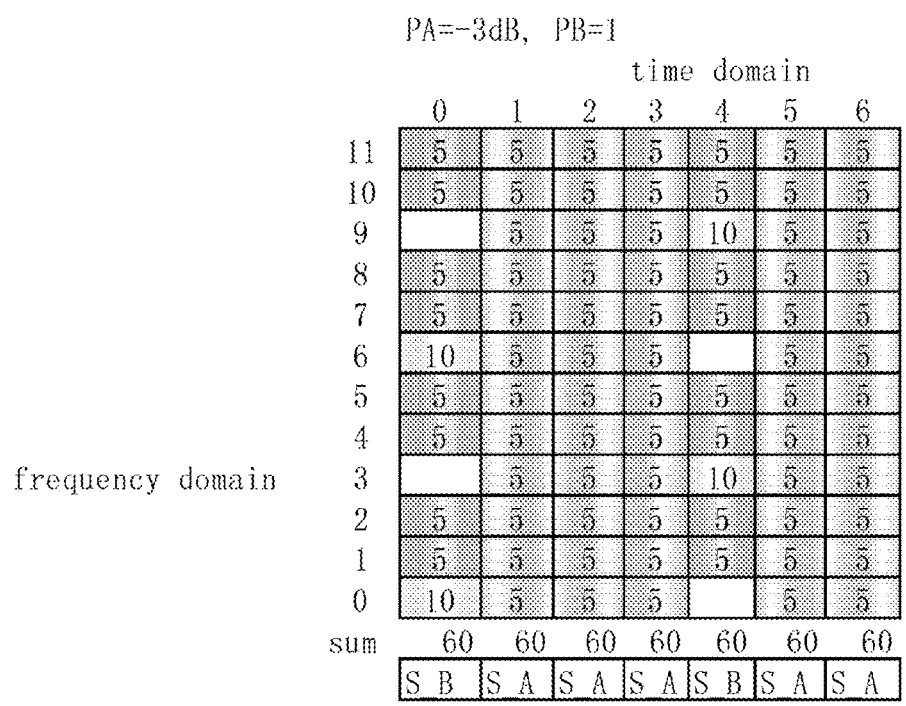
Figure 4:
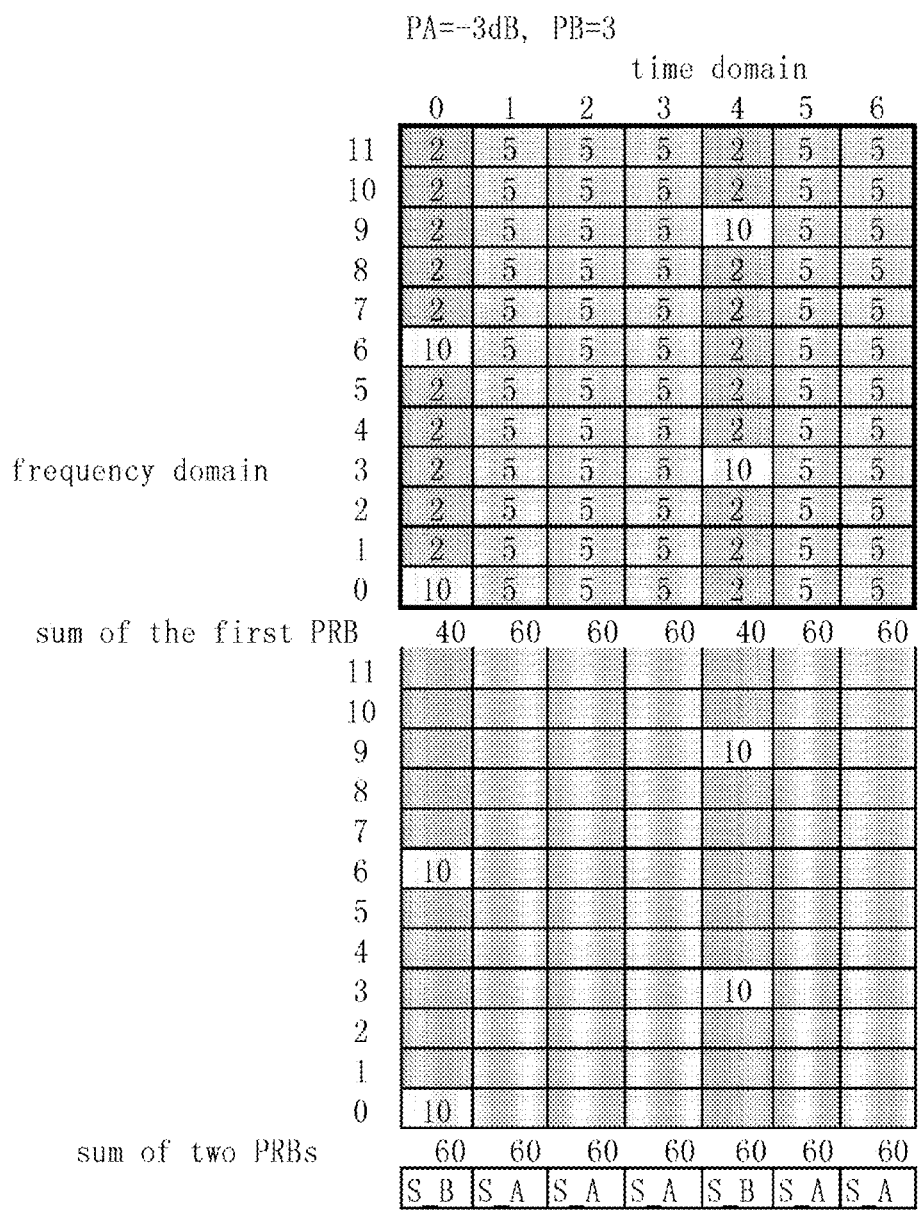
FIG. 4 illustrates an example of downlink power allocation for LTE by offloading a PRB.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

As described in the background part, UE of NBIoT receives the downlink signal with bandwidth of 1 PRB and PDSCH bandwidth is fixed as 1 PRB for inband deployment. Therefore, it is necessary to determine the time domain power (EPRE) of NBIoT in one carrier or one PRB bandwidth (i.e. 12 subcarriers).

Figure 5A:
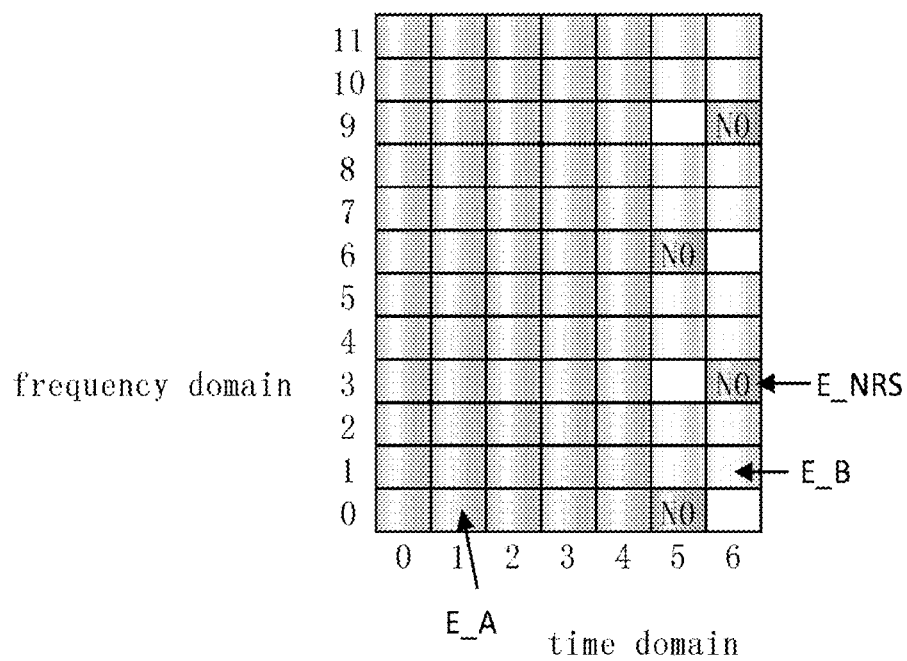
FIGS. 5A-5C illustrate examples of downlink power allocation for NBIoT.

In NBIoT, the downlink REs can be NPDSCH REs or NRS REs. FIG. 5A illustrates an example of downlink power allocation for NBIoT in case of guardband deployment or standalone deployment, in which the number of NRS antenna ports is 2 (e.g. NRS antenna port 0 and NRS antenna port 1). In FIG. 5A, "N0" refers to the NRS RE of NRS antenna port 0.

In the example of FIG. 5A, the symbols in one carrier or PRB are divided into two types (Type A symbol, Type B symbol).

If all of 12 REs in a symbol, which do not contain any NRS (narrowband reference signal) RE (indicated as N0 in FIG. 5A), are NPDSCH REs, the symbol belongs to Type A symbol. Symbols 0, 1, 2, 3 and 4 of one slot in FIG. 5A belong to Type A symbol.

If the 12 REs in a symbol contain NPDSCH REs, e.g. contain both NRS REs and NPDSCH REs, the symbol belongs to type B symbol. Symbols 5 and 6 in FIG. 5A belong to Type B symbol.

It can be seen from FIG. 5A that the REs can be divided into 3 categories: NRS RE, NPDSCH RE in type A symbols, NPDSCH RE in type B symbols. Incidentally, the REs illustrated as blank blocks ((symbol 5, subcarrier 3), (symbol 5, subcarrier 9), (symbol 6, subcarrier 0) and (symbol 6, subcarrier 6)) are NRS REs of another NRS antenna port (e.g. NRS antenna port 1). Accordingly, EPREs in the PRB of FIG. 5A can be divided into 3 categories:

(1) The EPRE of NRS RE (i.e. NRS EPRE, abbreviated as E_NRS);
(2) The EPRE of each NPDSCH RE in type A symbols (i.e. E_A); and
(3) The EPRE of each NPDSCH RE in type B symbols (i.e. E_B).

Incidentally, the EPRE of the NRS REs of another NRS antenna port is zero (0).

S_A denotes the total power of one type A symbol within 1 PRB or 1 carrier which includes 12 PDSCH REs, i.e. S_A=12*E_A. S_B denotes the total power of one type B symbol within 1 PRB or 1 carrier. In FIG. 5A, S_B=2*E_NRS+8*E_B for the case of the number of antenna ports being 2. The power efficiency for each PRB or each allocated UE is defined as min(S_A, S_B)/max(S_A, S_B).

Figure 5B:
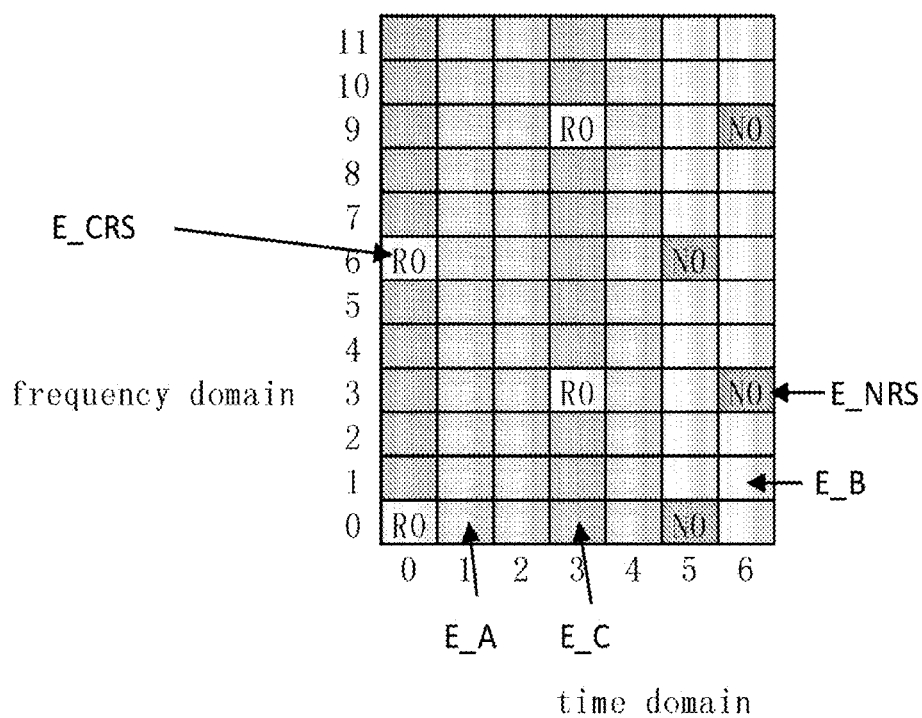

In case of inband deployment, the downlink REs may alternatively be CRS REs. Therefore, in case of inband deployment, the downlink REs can be NPDSCH REs or NRS REs or CRS REs. FIG. 5B illustrates an example of downlink power allocation for NBIoT in the case of inband deployment, in which the number of NRS antenna ports is 1 (e.g. NRS antenna port 0) and the number of CRS antenna ports is 1 (e.g. CRS antenna port 0). In FIG. 5B, "N0" refers to the NRS RE of NRS antenna port 0 while "R0" refers to the CRS RE of CRS antenna port 0).

In the example of FIG. 5B, the symbols in one PRB can be divided into three types (Type A symbol, Type B symbol, Type C symbol).

If all of 12 REs in a symbol, which do not contain any NRS RE (indicated as N0 in FIG. 5B) nor any CRS RE (indicated as R0 in FIG. 5B), are NPDSCH REs, the symbol belongs to Type A symbol. Symbols 1, 2 and 4 in FIG. 5B belong to Type A symbol. If the number of CRS antenna ports is 4, symbol 1 does not belong to Type A symbol but belongs to Type C symbol (see below).

If the 12 REs in a symbol contain NRS REs, e.g., contain both NRS REs and NPDSCH REs, the symbol belongs to type B symbol. Symbols 5 and 6 in FIG. 5B belong to Type B symbol.

If the 12 REs in a symbol contain CRS REs, e.g., contain both CRS REs and NPDSCH REs, the symbol belongs to type C symbol. Symbols 0 and 3 in FIG. 5B belong to Type C symbol. If the number of CRS antenna ports is 4, symbol 1 also belongs to Type C symbol.

It can be seen from FIG. 5B that the REs can be divided into 5 categories: NRS RE, NPDSCH RE in type A symbols, NPDSCH RE in type B symbols, as well as CRS RE and NPDSCH RE in type C symbols. Accordingly, EPREs in the PRB of FIG. 5B can be divided into 5 categories:

(1) The EPRE of NRS RE (i.e. NRS EPRE, abbreviated as E_NRS);
(2) The EPRE of each NPDSCH RE in type A symbols (i.e. E_A);
(3) The EPRE of each NPDSCH RE in type B symbols (i.e. E_B);
(4) The EPRE of each NPDSCH RE in type C symbols (i.e. E_C); and
(5) The EPRE of CRS RE (i.e. CRS EPRE, abbreviated as E_CRS).

S_A denotes the total power of one type A symbol within 1 PRB or 1 carrier which includes 12 PDSCH REs, i.e. S_A=12*E_A. S_B denotes the total power of one type B symbol within 1 PRB or 1 carrier. In FIG. 5B, a type B symbol includes 2 NRS REs and 10 PDSCH REs, i.e. S_B=2*E_NRS+10*E_B. S_C denotes the total power of one type C symbol within 1 PRB or 1 carrier. In FIG. 5B, a type C symbol includes 2 CRS REs and 10 PDSCH REs, i.e. S_C=2*E_CRS+10*E_C. The power efficiency for each PRB or each allocated UE is defined as min(S_A, S_B, S_C)/max(S_A, S_B, S_C).

Figure 5C:
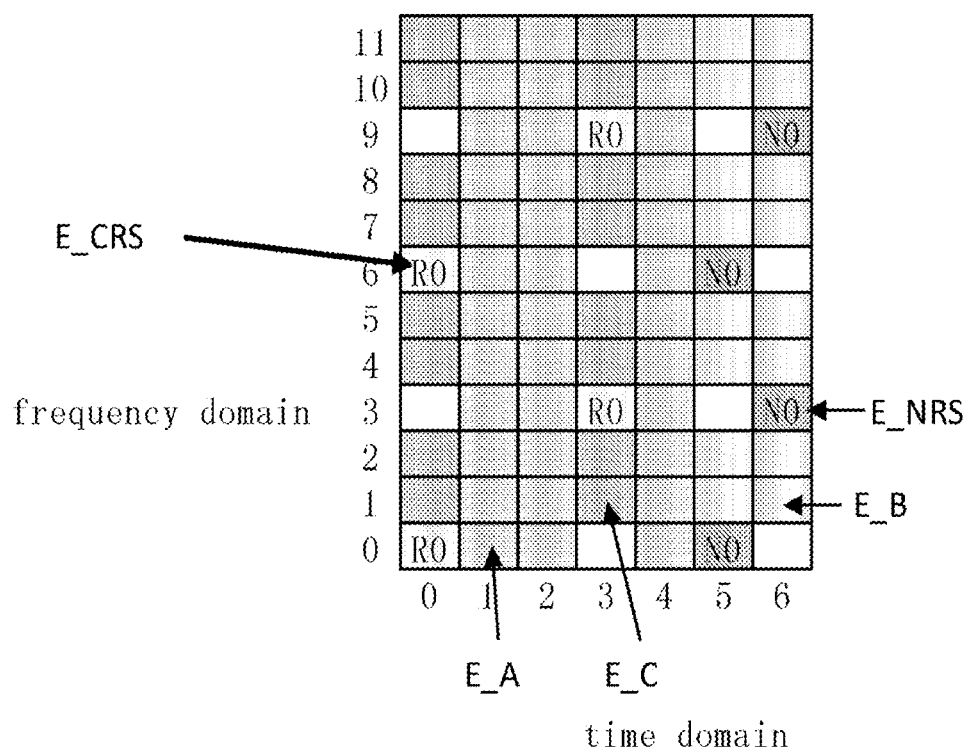

FIG. 5C illustrates another example of downlink power allocation for NBIoT in the case of inband deployment, in which the number of NRS antenna ports is 2 (e.g. NRS antenna port 0 and NRS antenna port 1) and the number of CRS antenna ports is 2 (e.g. CRS antenna port 0 and CRS antenna port 1).

As can be seen from FIG. 5C, "N0" refers to the NRS RE of NRS antenna port 0 while "R0" refers to the CRS RE of CRS antenna port 0). In type B symbols 5 and 6, there are four REs illustrated as blank blocks ((symbol 5, subcarrier 3), (symbol 5, subcarrier 9), (symbol 6, subcarrier 0) and (symbol 6, subcarrier 6)), that are NRS REs of another NRS antenna port (e.g. NRS antenna port 1). Similarly, in type C symbols 0 and 4, there are four REs illustrated as blank blocks ((symbol 0, subcarrier 3), (symbol 0, subcarrier 9), (symbol 4, subcarrier 0) and (symbol 4, subcarrier 6)), that are CRS REs of another CRS antenna port (e.g. CRS antenna port 1).

EPREs in the PRB or carrier of FIG. 5C can be divided into the same 5 categories as described for the EPREs in the PRB of FIG. 5B.

The EPRE of the NRS REs (e.g., NRS antenna port 0) is E_NRS. The EPRE of the CRS REs (e.g., CRS antenna port 0) is E_CRS. Accordingly, in the example of FIG. 5C, S_A=12*E_A; S_B=2*E_NRS+8*E_B; and S_C=2*E_CRS+8*E_C.

As a whole, each NRS RE, each NPDSCH RE in type A symbols, each NPDSCH RE in type B symbols, each NPDSCH RE in type C symbols and each CRS RE are respectively associated with E_NRS, E_A, E_B, E_C and E_CRS. This means that eNB transmits data or reference signal in each NRS RE, each NPDSCH RE in type A symbols, each NPDSCH RE in type B symbols, each NPDSCH RE in type C symbols and each CRS RE with the powers of E_NRS, E_A, E_B, E_C and E_CRS, respectively, while the UE assumes the same (i.e. the UE assumes that the eNB transmits NBIoT reference signal in each NRS RE with the power of E_NRS, transmits data in each NPDSCH RE in type A symbols with the power of E_A, transmits data in each NPDSCH RE in type B symbols with the power of E_B, transmits data in each NPDSCH RE in type C symbols with the power of E_C, and transmits cell specific reference signal in each CRS RE with the power of E_CRS).

The NRS EPRE (E_NRS) is constant across downlink system bandwidth (i.e. 1 PRB), and is configured by higher layers. For example, the downlink NRS EPRE (E_NRS) can be derived from the downlink narrowband reference-signal transmit power given by nrs-Power+nrs-PowerOffsetNonAnchor, where the parameter nrs-Power is provided by higher layers and nrs-PowerOffsetNonAnchor is zero if it is not provided by higher layers.

The first embodiment is related to the configuration of the EPRE of each NPDSCH RE in type A symbols (E_A) and the EPRE of each NPDSCH RE in type B symbols (E_B).

The ratio of E_A to E_NRS is denoted by $\rho_A = E\_A/E\_NRS$. $\rho_A$ is determined by PA, and in particular, $PA[dB] = 10 \lg \rho_A$. PA is configured by higher layer parameter p-a from a set of $\{-6, -4.77, -3, -1.77, 0, 1, 2, 3\}[dB]$. According to $PA[dB] = 10 \lg \rho_A$, $\rho_A$ is a number chosen from a set of $\{\frac{1}{4}, \frac{1}{3}, \frac{1}{2}, \frac{2}{3}, 1, 1.2589, 1.5849, 2\}$.

The ratio of E_B to E_NRS is denoted by $\rho_B = E\_B/E\_NRS$.

$\rho_B$ may be determined by PB. In particular, $\rho_B/\rho_A$ is determined by the value of PB. PB is the NPDSCH EPRE power index, and is configured by a higher layer parameter p-b from a set of $\{0, 1, 2, 3\}$. FIG. 6 illustrates the value of $\rho_B/\rho_A$ for different values of PB. In condition of "one NRS antenna port" and in condition of "two NRS antenna ports", the values of $\rho_B/\rho_A$ are different for the same value of PB.

On the other hand, to facilitate the AGC by UE and at least for standalone deployment (to make sure that the power of type A symbol and type B symbol within 1 PRB or 1 carrier are same), $\rho_B$ may be alternatively determined directly by $\rho_A$. For example, $\rho_B = 6\rho_A/5 - \frac{1}{5}$ for one NRS antenna port, and $\rho_B = 3\rho_A/2 - \frac{1}{4}$ for two NRS antenna ports.

The second embodiment is related to the configuration of the EPRE of each NPDSCH RE in type C symbols (E_C) and the EPRE of CRS RE (E_CRS).

The EPRE of CRS RE (E_CRS) is determined by a higher layer parameter nrs-CRS-PowerOffset ($pC_RS$) on the basis of the NRS EPRE (E_NRS). That is, pCRS=E_CRS/E_NRS.

The E_C may be derived by introducing a parameter PC. In particular, the ratio of E_C to E_NRS is denoted by $\rho_C$=E_C/E_NRS. $\rho_C$ is determined by PC, and in particular, PC[dB]=10 lg$\rho_C$. PC is configured by a higher layer parameter p-c from a set of {−6, −4.77, −3, −1.77, 0, 1, 2, 3}[dB]. According to PC[dB]=10 lg$\rho_C$, $\rho_C$ is a number chosen from a set of {¼, ⅓, ½, ⅔, 1, 1.2589, 1.5849, 2}. When E_C is determined by the parameter PC, there is no constraint for the value of E_C by E_A and/or E_B and/or E_CRS. That is, if the power of S_C is larger than a larger one of S_A and S_B or smaller than a smaller one of S_A and S_B, the power efficiency will be reduced, such that the detection performance of the UE will be degraded due to inaccurate AGC.

In view of the above, the E_C may be alternatively derived by configuring the parameter PC in a different manner. In particular, the ratio of E_C to E_NRS is denoted by $\rho_C$=E_C/E_NRS. $\rho_C$ may be determined by PC. In particular, $\rho_C/\rho_A$ is determined by the value of PC. PC is configured by a higher layer parameter p-c from a set of {0, 1, 2, 3}. FIG. 7 illustrates the value of $\rho_C/\rho_A$ for different values of PC. In condition of "one CRS antenna port" and in condition of "two or four CRS antenna ports", the values of $\rho_C/\rho_A$ are different for the same value of PC. This gives more flexibility to eNB.

The CRS port number is determined by the NRS antenna port number and some other higher layer parameters.

If the higher layer indicates that the PCID of LTE is the same as PCID of NBIoT, UE shall assume the number of CRS antenna ports is the same as the number of NRS antenna ports.

Otherwise, the number of CRS antenna ports is obtained from the higher layer parameter eutra-NumCRS-Ports. The higher layer parameter eutra-NumCRS-Ports can have a value "Same" (which means that the number of CRS antenna ports is the same as the number of NRS antenna ports) or "four" (which means that the number of CRS antenna ports is 4). As a whole, when the number of NRS antenna ports is 1, the number of CRS antenna ports can be 1 or 4; and when the number of NRS antenna ports is 2, the number of CRS antenna ports can be 2 or 4.

According to the second embodiment, the ratio of the EPRE of each NPDSCH RE in type C symbols (E_C) to NRS EPRE (E_NRS) is denoted by $\rho_C$, which seems to provide eNB with more configuration flexibility. However, the eNB is hard to configure all of the parameters PA, PB and PC to improve the power efficiency. Actually, some of the parameters are useless. For example, when S_A and S_B are determined by parameters PA and PB, the power range of S_C is almost determined (i.e. PC is also almost determined) if we don't want to even degrade the power efficiency and affect the UE AGC. In other words, there is no need to configure the parameter PC. If we force the eNB to configure the parameter PC, it will increase the load of network optimizations.

An example is illustrated in FIG. 8, in which the number of NRS antenna port is 1 and the number of CRS antenna port is 1. In FIG. 8, E_NRS=80 dBm,
PA=−3 dB->E_A=40 dBm,
PB=0->$\rho_B/\rho_A$=1->E_B=40 dBm,
E_NRS/E_CRS=8->E_CRS=10 dBm.

In this condition, E_C should be boosted due to lower power of E_CRS. However, E_C can only be configured maximally as 40 dBm (when $\rho_C/\rho_A$=1 which is the maximum value for 1 CRS antenna port). In view of the above, even the configurations of PA, PB and PC are flexible, the power efficiency is still not high. No matter which value (power of 420 dBm or 480 dBm or 560 dBm) is selected by the UE to adjust the AGC, the performance of demodulation is largely degraded.

According to a third embodiment, the ratio of E_C to E_NRS is denoted by $\rho_C$=E_C/E_NRS. $\rho_C$ is derived by existing parameters PA and/or PB and/or $\rho_{CRS}$ or existing parameters $\rho_A$ and/or $\rho_B$ and/or $\rho_{CRS}$. The power of type C symbol (S_C) can be easily derived by referring to the power of type A symbol (S_A) and/or the power of type B symbol (S_B). eNB can configure PA and/or PB (or configure $\rho_A$ and/or $\rho_B$) and/or $\rho_{CRS}$ to indirectly configure $\rho_C$.

In a first sub-embodiment, the power of S_C is the same as power of S_A (S_C=S_A).

S_A=12*E_A=12*$\rho_A$*E_NRS.

For one CRS antenna port, S_C is denoted as S_C1=2*E_CRS+10*E_C=2*$\rho_{CRS}$*E_NRS+10*$\rho_C$*E_NRS. For two or four CRS antenna ports, S_C is denoted as S_C2=2*E_CRS+8*E_C=2*$\rho_{CRS}$*E_NRS+8*$\rho_C$*E_NRS.

Therefore, in condition of one CRS antenna port, S_A=S_C1->12*$\rho_A$*E_NRS=2*$\rho_{CRS}$*E_NRS+10*$\rho_C$*E_NRS->$\rho_C$=6$\rho_A$/5−$\rho_{CRS}$/5. In condition of two or four CRS antenna ports, S_A=S_C2->12*$\rho_A$*E_NRS=2*$\rho_{CRS}$*E_NRS+8*$\rho_C$*E_NRS->$\rho_C$=3$\rho_A$/2−$\rho_{CRS}$/4.

According to the first sub-embodiment, $\rho_C$ is denoted as $\rho_{C1}$ and can be determined as the following table 2.

TABLE 2

| $\rho_{C1}$ in condition of different numbers of CRS antenna ports | | |
| --- | --- | --- |
| | 1 CRS antenna port | 2 or 4 CRS antenna ports |
| $\rho_{c1}$ | 6$\rho_A$/5 − $\rho_{CRS}$/5 | 3$\rho_A$/2 − $\rho_{CRS}$/4 |

In a second sub-embodiment, the power of S_C is the same as power of S_B (S_C=S_B).

For one NRS antenna port, S_B is denoted as S_B1=2*E_NRS+10*E_B=2*E_NRS+10*$\rho_B$*E_NRS. For two NRS antenna ports, S_B is denoted as S_B2=2*E_NRS+8*E_B=2*E_NRS+8*$\rho_B$*E_NRS.

For one CRS antenna port, S_C is denoted as S_C1=2*E_CRS+10*E_C=2*$\rho_{CRS}$*E_NRS+10*$\rho_C$*E_NRS. For two or four CRS antenna ports, S_C is denoted as S_C2=2*E_CRS+8*E_C=2*$\rho_{CRS}$*E_NRS+8*$\rho_C$*E_NRS.

In the condition of one NRS antenna port and one CRS antenna port, S_B1=S_C1->2*ENRS+10*$\rho_B$*E_NRS=2*$\rho_{CRS}$*E_NRS+10*$\rho_C$*E_NRS->$\rho_C$=⅕+$\rho_B$−$\rho_{CRS}$/5.

In the condition of one NRS antenna port and two or four CRS antenna ports, S_B1=S_C2->2*E_NRS+10*$\rho_B$*E_NRS=2*$\rho_{CRS}$*E_NRS+8*$\rho_C$*E_NRS->$\rho_C$=¼+5$\rho_B$/4−$\rho_{CRS}$/4.

In the condition of two NRS antenna ports and two or four CRS antenna ports, S_B2=S_C2->2*E_NRS+8*$\rho_B$*E_NRS=2*$\rho_{CRS}$*E_NRS+8*$\rho_C$*E_NRS->$\rho_C$=¼+$\rho_B$−$\rho_{CRS}$/4.

According to the second sub-embodiment, $\rho_C$ is denoted as $\rho_{C2}$ and can be determined as the following table 3

TABLE 3

$\rho_{C2}$ in condition of different numbers of NRS antenna ports and different numbers of CRS antenna ports

| $\rho_{c2}$ | 1 CRS antenna port | 2 or 4 CRS antenna ports |
|---|---|---|
| 1 NRS antenna port | $1/5 + \rho_B - \rho_{CRS}/5$ | $1/4 + 5\rho_B/4 - \rho_{CRS}/4$ |
| 2 NRS antenna ports | (Not applicable) | $1/4 + \rho_B - \rho_{CRS}/4$ |

In a third sub-embodiment, the power of S_C is respectively determined according to the first sub-embodiment and the second sub-embodiment. In particular, $\rho_{C1}$ is determined according to the first sub-embodiment and $\rho_{C2}$ is determined according to the second sub-embodiment. According to the third sub-embodiment, $\rho_C$ is denoted as $\rho_{C3}$ and can be determined as one of $\rho_{C1}$ and $\rho_{C2}$. The eNB may indicate $\rho_{C3}$ by a higher layer signaling based its implementation. For example, 1 bit can be used to indicate whether $\rho_{C1}$ or $\rho_{C2}$ would be applied.

In a fourth sub-embodiment, the eNB may choose a value from a predefined set of $\{-6, -4.77, -3, -1.77, 0, 1, 2, 3\}$ that is closest to one of the above-determined $\rho_{C1}$, $\rho_{C2}$ and $\rho_{C3}$. The value chosen from the set (referred to as $\rho_{C4}$) that is closest to one of the above-determined $\rho_{C1}$, $\rho_{C2}$ and $\rho_{C3}$ (referred to as $\rho_{C0}$) means the smallest value chosen from the set that is larger than $\rho_{C0}$, or the largest value chosen from the set that is smaller than $\rho_{C0}$. For example, if $\rho_{C0}$ (one of the above-determined $\rho_{C1}$, $\rho_{C2}$ and $\rho_{C3}$, i.e. one of the above-determined $\rho_{C1}$ and $\rho_{C2}$ as $\rho_{C3}$ is one of $\rho_{C1}$ and $\rho_{C2}$) is $-1$, $\rho_{C4}$ may be $-1.77$ (the largest value in the set that is smaller than $-1$) or 0 (the smallest value in the set that is larger than $-1$).

In a fifth sub-embodiment, a predefined value M can be introduced to limit the value of $\rho_C$. In one implementation, the predefined value M may refer to the minimum value of $\rho_C$. For example, M is predefined value of 0.25 (i.e. $-6$ dB). In this implementation, $\rho_{C1}$ can be determined as the following table 4.

TABLE 4

$\rho_{C1}$ in condition of different numbers of CRS antenna ports with a minimum value M

| | 1 CRS antenna port | 2 or 4 CRS antenna ports |
|---|---|---|
| $\rho_{c1}$ | Max $(6\rho_A/5 - \rho_{CRS}/5, M)$ | Max $(3\rho_A/2 - \rho_{CRS}/4, M)$ |

And, $\rho_{C2}$ can be determined as the following table 5.

TABLE 5

$\rho_{C2}$ in condition of different numbers of NRS antenna ports and different numbers of CRS antenna ports with a minimum value M

| $\rho_{c2}$ | 1 CRS antenna port | 2 or 4 CRS antenna ports |
|---|---|---|
| 1 NRS antenna port | Max $(1/5 + \rho_B - \rho_{CRS}/5, M)$ | Max $(1/4 + 5\rho_B/4 - \rho_{CRS}/4, M)$ |
| 2 NRS antenna ports | (Not applicable) | Max $(1/4 + \rho_B - \rho_{CRS}/4, M)$ |

In another implementation, the predefined value M may refer to the maximum value of $\rho_C$. For example, M is predefined value of 4 (i.e. 6 dB). In such implementation, $\rho_{C1}$ can be determined as the following table 6.

TABLE 6

$\rho_{C1}$ in condition of different numbers of CRS antenna ports with a maximum value M

| | 1 CRS antenna port | 2 or 4 CRS antenna ports |
|---|---|---|
| $\rho_{C1}$ | Min $(6\rho_A/5 - \rho_{CRS}/5, M)$ | Min $(3\rho_A/2 - \rho_{CRS}/4, M)$ |

And, $\rho_{C2}$ can be determined as the following table 7:

TABLE 7

$\rho_{C2}$ in condition of different numbers of NRS antenna ports and different numbers of CRS antenna ports with a maximum value M

| $\rho_{c2}$ | 1 CRS antenna port | 2 or 4 CRS antenna ports |
|---|---|---|
| 1 NRS antenna port | Min $(1/5 + \rho_B - \rho_{CRS}/5, M)$ | Min $(1/4 + 5\rho_B/4 - \rho_{CRS}/4, M)$ |
| 2 NRS antenna ports | (Not applicable) | Min $(1/4 + \rho_B - \rho_{CRS}/4, M)$ |

The fifth sub-embodiment can be used together with the third sub-embodiment or together with the fourth sub-embodiment. For example, when used together with the third sub-embodiment, $\rho_{C1}$ is determined according table 4 or 6, and $\rho_{C2}$ is determined according to table 5 or 7. Then, the eNB may indicate $\rho_{C3}$ (i.e., $\rho_{C1}$ or $\rho_{C2}$) by a higher layer signaling (e.g., 1 bit).

When used together with the fourth embodiment, $\rho_{C1}$ is determined according table 4 or 6, and $\rho_{C2}$ is determined according to table 5 or 7. Then, a value (the smallest value that is larger than $\rho_{C1}$ or $\rho_{C2}$, or the largest value that is smaller than $\rho_{C1}$ or $\rho_{C2}$) is chosen from the predefined set.

It thus can be seen from the third embodiment that $\rho_{C1}$ is determined from $\rho_A$ and $\rho_{CRS}$ (the first sub-embodiment) or from $\rho_A$, $\rho_{CRS}$ and a predefined value M (the fifth sub-embodiment). Depending on different numbers of CRS antenna ports, $\rho_{C1}$ is determined differently. $\rho_{C2}$ is determined from $\rho_B$ and $\rho_{CRS}$ (the second sub-embodiment) or from $\rho_B$, $\rho_{CRS}$ and a predefined value M (the fifth sub-embodiment). Depending on different numbers of CRS antenna ports and/or different numbers of NRS antenna ports, $\rho_{C2}$ is determined differently. Therefore, $\rho_C$ is determined by at least one of $\rho_{C1}$, $\rho_{C2}$, and the predefined value M. In particular, when M refers to a minimum value of $\rho_C$, $\rho_C$ is determined by a larger value of at least two of $\rho_{C1}$, $\rho_{C2}$ and M; and when M refers to a maximum value of $\rho_C$, $\rho_C$ is determined by a smaller value of at least two of $\rho_{C1}$, $\rho_{C2}$ and M. $\rho_{C3}$ is determined as one of $\rho_{C1}$ and $\rho_{C2}$. $\rho_{C4}$ is determined from a predefined set by referring to one of $\rho_{C1}$ and $\rho_{C2}$.

Figure 9:
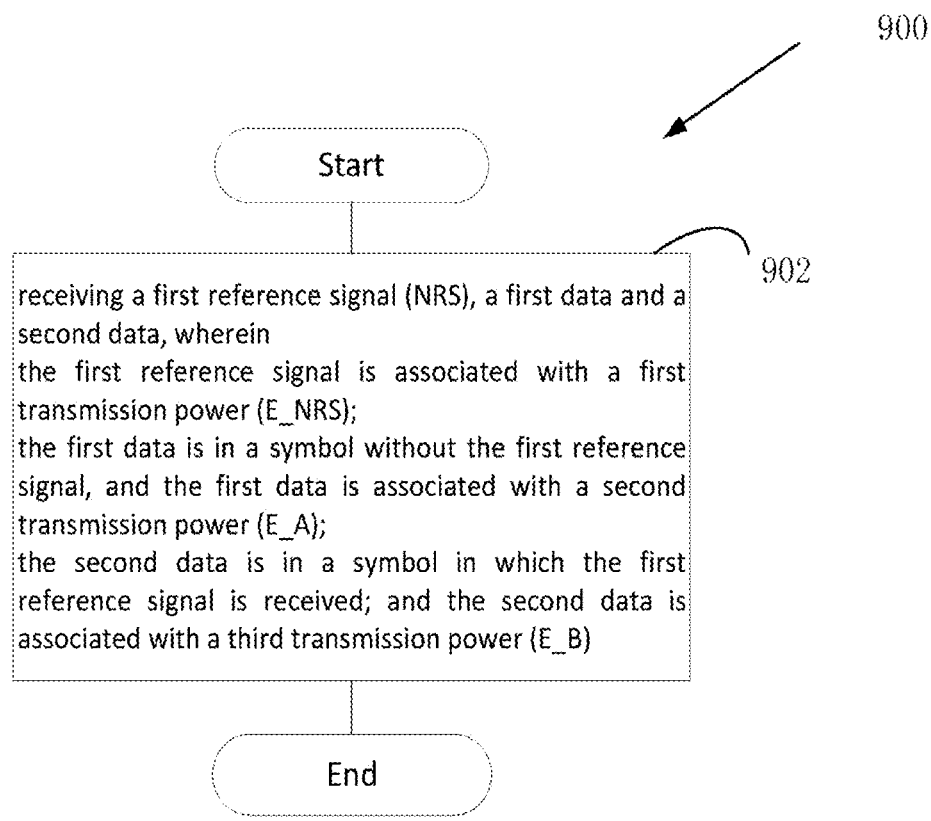
FIG. 9 is a schematic flow chart diagram illustrating an embodiment of a method.

FIG. 9 is a schematic flow chart diagram illustrating an embodiment of a method 900 according to the present application. In some embodiments, the method 900 is performed by an apparatus, such as a remote unit. In certain embodiments, the method 900 may be performed by a processor executing program code, for example, a microcontroller, a microprocessor, a CPU, a GPU, an auxiliary processing unit, a FPGA, or the like.

The method 900 may include receiving a first reference signal (NRS), a first data and a second data, wherein the first reference signal is associated with a first transmission power (E_NRS); the first data is in a symbol without the first reference signal, and the first data is associated with a second transmission power (E_A); and the second data is in a symbol in which the first reference signal is received; and the second data is associated with a third transmission power (E_B).

Figure 10:
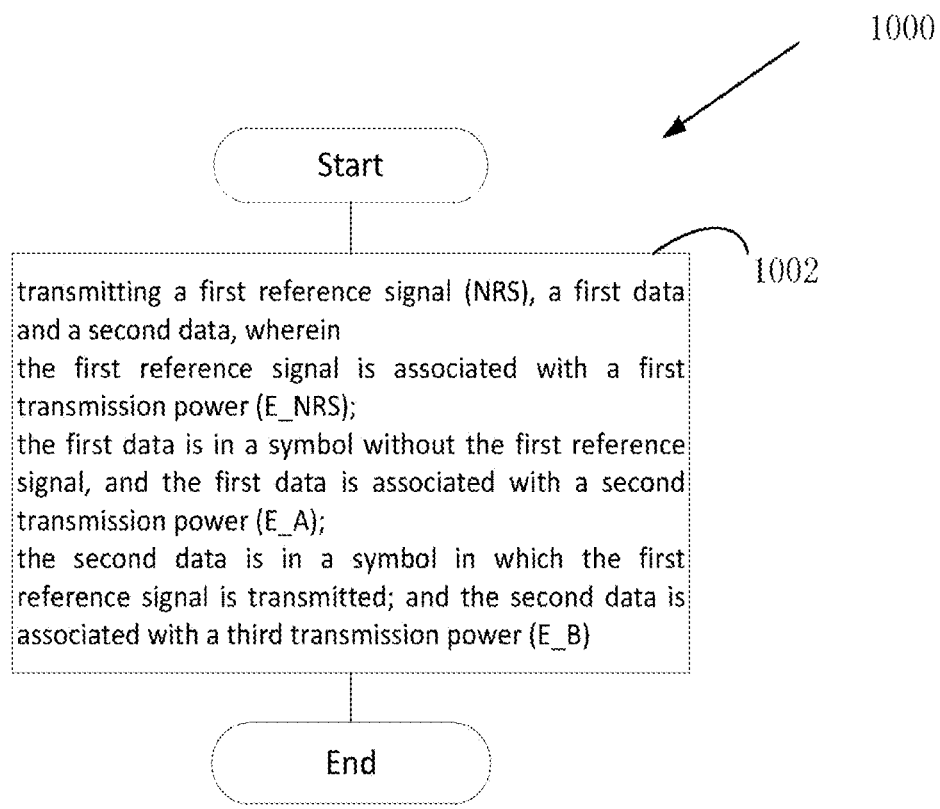
FIG. 10 is a schematic flow chart diagram illustrating a further embodiment of a method.

FIG. 10 is a schematic flow chart diagram illustrating a further embodiment of a method 1000 according to the present application. In some embodiments, the method 1000 is performed by an apparatus, such as a base unit. In certain embodiments, the method 1000 may be performed by a processor executing program code, for example, a microcontroller, a microprocessor, a CPU, a GPU, an auxiliary processing unit, a FPGA, or the like.

The method 1000 may include transmitting a first reference signal (NRS), a first data and a second data, wherein the first reference signal is associated with a first transmission power (E_NRS); the first data is in a symbol without the first reference signal, and the first data is associated with a second transmission power (E_A); and the second data is in a symbol in which the first reference signal is received; and the second data is associated with a third transmission power (E_B).

Figure 11:
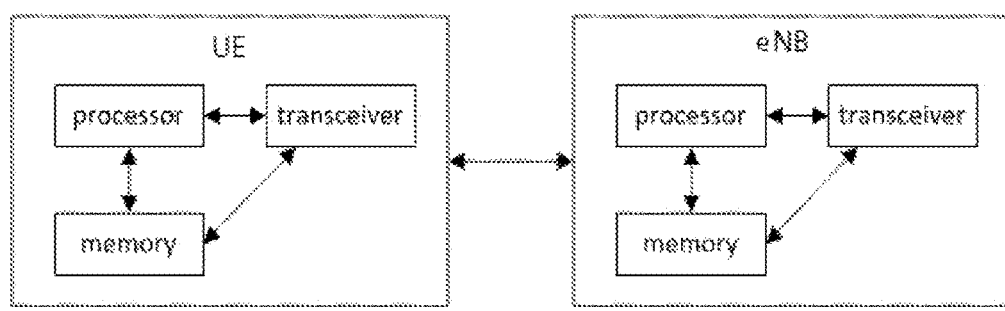
FIG. 11 is a schematic block diagram illustrating apparatuses according to one embodiment.

FIG. 11 is a schematic block diagram illustrating apparatuses according to one embodiment.

Referring to FIG. 11, the UE (i.e. the remote unit) includes a processor, a memory, and a transceiver. The processor implements a function, a process, and/or a method which are proposed in FIG. 9. The eNB (i.e. base unit) includes a processor, a memory, and a transceiver. The processors implement a function, a process, and/or a method which are proposed in FIG. 10. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE) the method comprising:
   receiving a first reference signal,
   wherein the first reference signal is associated with a first transmission power;
   receiving first data in a symbol without the first reference signal, wherein the first data is associated with a second transmission power;
   receiving second data in a same symbol as the first reference signal wherein the second data is associated with a third transmission power;
   receiving a second reference signal associated with a fourth transmission power; and
   receiving third data in a same symbol as the second reference signal,
   wherein the third data is associated with a fifth transmission power.

2. The method of claim 1, wherein the second transmission power is determined by the first transmission power and a first power ratio.

3. The method of claim 1, wherein the third transmission power is determined by the first transmission power and a second power ratio.

4. The method of claim 1, wherein the fifth transmission power is determined by the first transmission power and a fourth power ratio.

5. The method of claim 3, wherein the second power ratio is determined by a first power ratio and a number of antenna ports of the first reference signal.

6. A user equipment (UE) for wireless communications, comprising:
   at least one memory; and
   at least one processor coupled with the at least one memory and operable to cause the UE to:
      receive a first reference signal, wherein the first reference signal is associated with a first transmission power;
      receive first data in a symbol without the first reference signal, wherein the first data is associated with a second transmission power;
      receive second data in a same symbol as the first reference signal wherein the second data is associated with a third transmission power;
      receive a second reference signal associated with a fourth transmission power; and
      receive third data in a same symbol as the second reference signal, wherein the third data is associated with a fifth transmission power.

7. The UE of claim 6, wherein the second transmission power is determined by the first transmission power and a first power ratio.

8. The UE of claim 6, wherein the third transmission power is determined by the first transmission power and a second power ratio.

9. The UE of claim 6, wherein the fourth transmission power is determined by the first transmission power and a third power ratio.

10. The UE of claim 6, wherein the fifth transmission power is determined by the first transmission power and a fourth power ratio.

11. The UE of claim 8, wherein the second power ratio is determined by a first power ratio and a number of antenna ports of the first reference signal.

12. The UE of claim 10, wherein the fourth power ratio is determined by at least one of a number of antenna ports of the first reference signal, the number of antenna ports of the second reference signal, a first power ratio, a second power ratio, a third power ratio or a predefined power ratio value.

13. The UE of claim 12, wherein the fourth power ratio is determined by the first power ratio and the number of antenna ports of the second reference signal.

14. The UE of claim 12, wherein the fourth power ratio is determined by at least one of a first power ratio value determined by the first power ratio and the third power ratio, a second power ratio value determined by the second power ratio and the third power ratio, or the predefined power ratio value.

15. The UE of claim 14, wherein the fourth power ratio is determined by a larger or smaller value of at least two of the first power ratio value, the second power ratio value, or the predefined power ratio value.

16. The UE of claim 14, wherein the fourth power ratio is indicated by higher layer signaling from the first power ratio value and the second power ratio value.

17. The UE of claim 14, wherein the fourth power ratio is a value chosen from a predefined power ratio set, the value is a smallest value of the predefined power ratio set that is larger than one of the first power ratio value or the second power ratio value, or a largest value of the predefined power ratio set that is smaller than one of the first power ratio value or the second power ratio value.

18. A base unit for wireless communications, comprising:
at least one memory; and
at least one processor coupled with the at least one memory and operable to cause the base unit to:
transmit a first reference signal,
wherein the first reference signal is associated with a first transmission power;
transmit first data in a symbol without the first reference signal,
wherein the first data is associated with a second transmission power;
transmit second data in a same symbol as the first reference signal,
wherein the second data is associated with a third transmission power;
transmit a second reference signal associated with a fourth transmission power; and
transmit third data in a same symbol as the second reference signal,
wherein the third data is associated with a fifth transmission power.

19. The base unit of claim 18, wherein the second transmission power is based at least in part on the first transmission power and a first power ratio, and wherein the third transmission power is based at least in part on the first transmission power and a second power ratio.

20. A method performed by a base unit, the method comprising:
transmitting a first reference signal,
wherein the first reference signal is associated with a first transmission power;
transmitting first data in a symbol without the first reference signal,
wherein the first data is associated with a second transmission power;
transmitting second data in a same symbol as the first reference signal,
wherein the second data is associated with a third transmission power;
transmitting a second reference signal associated with a fourth transmission power; and
transmitting third data in a same symbol as the second reference signal,
wherein the third data is associated with a fifth transmission power.

* * * * *